(12) United States Patent
Lee et al.

(10) Patent No.: US 10,894,498 B2
(45) Date of Patent: Jan. 19, 2021

(54) CONTAINER

(71) Applicant: LG Chem, Ltd., Seoul (KR)

(72) Inventors: Hyun Min Lee, Daejeon (KR); Ji Young Choi, Daejeon (KR); Tae Yeop Kim, Daejeon (KR); Suk Chul Kim, Daejeon (KR); Ji Won Lee, Daejeon (KR)

(73) Assignee: LG Chem, Ltd.

( * ) Notice: Subject to any disclaimer, the term of this patent is extended or adjusted under 35 U.S.C. 154(b) by 185 days.

(21) Appl. No.: 15/740,881

(22) PCT Filed: Jan. 6, 2017

(86) PCT No.: PCT/KR2017/000215
§ 371 (c)(1),
(2) Date: Dec. 29, 2017

(87) PCT Pub. No.: WO2017/119776
PCT Pub. Date: Jul. 13, 2017

(65) Prior Publication Data
US 2018/0339636 A1    Nov. 29, 2018

(30) Foreign Application Priority Data

Jan. 7, 2016 (KR) .................. 10-2016-0002043

(51) Int. Cl.
*B60P 1/64* (2006.01)
*B65D 90/00* (2006.01)
*B65D 85/62* (2006.01)

(52) U.S. Cl.
CPC ............... *B60P 1/6418* (2013.01); *B60P 1/64* (2013.01); *B60P 1/6409* (2013.01); *B60P 1/649* (2013.01);
(Continued)

(58) Field of Classification Search
CPC ......... B60P 1/6418; B60P 1/64; B60P 1/6409; B60P 1/6481; B60P 1/649; B65D 85/62;
(Continued)

(56) References Cited

U.S. PATENT DOCUMENTS 4,212,405 A    7/1980  Schmidt
4,801,229 A    1/1989  Hanada et al.
(Continued)

FOREIGN PATENT DOCUMENTS

CN    1496938 A    5/2004
CN    201272579 Y    7/2009
(Continued)

OTHER PUBLICATIONS

Search report from International Application No. PCT/KR2017/000215, dated Mar. 29, 2017.
(Continued)

*Primary Examiner* — Stephen T Gordon
(74) *Attorney, Agent, or Firm* — Lerner, David, Littenberg, Krumholz & Mentlik, LLP

(57) ABSTRACT

A container has an anti-vibration property so that the container does not shake in vibration. The container includes a bottom part, a ceiling part facing the bottom part, a sidewall part connecting the bottom part to the ceiling part, and a rack installed to be fixed in an inner space that is surrounded by the bottom part, the ceiling part, and the sidewall part.

16 Claims, 6 Drawing Sheets

(52) U.S. Cl.
CPC .......... *B60P 1/6481* (2013.01); *B65D 85/62* (2013.01); *B65D 90/0006* (2013.01); *B65D 90/0046* (2013.01)

(58) Field of Classification Search
CPC .............. B65D 88/022; B65D 90/0006; B65D 90/0046
USPC ......... 410/32, 33, 122; 312/107, 107.5, 111, 312/198, 245, 223.2; 211/204
See application file for complete search history.

(56) References Cited

U.S. PATENT DOCUMENTS

| | | | |
|---|---|---|---|
| 4,836,395 A | 6/1989 | Goutille | |
| 4,860,913 A | 8/1989 | Bertolini | |
| 6,179,522 B1 | 1/2001 | Sanford et al. | |
| 6,729,098 B1 * | 5/2004 | Brennan, Jr. | B60P 7/132 410/35 |
| 8,500,377 B2 * | 8/2013 | Hsiao | H05K 7/20736 410/33 |
| 9,828,172 B2 * | 11/2017 | Skeid | B65D 88/528 |
| 2002/0009346 A1 | 1/2002 | Holt et al. | |
| 2010/0165565 A1 | 7/2010 | Hellriegal et al. | |
| 2012/0160793 A1 | 6/2012 | Kondo et al. | |
| 2012/0263989 A1 | 10/2012 | Byun et al. | |
| 2014/0190964 A1 | 7/2014 | Skeid | |

FOREIGN PATENT DOCUMENTS

| | | | |
|---|---|---|---|
| CN | 201321244 Y | | 10/2009 |
| EP | 0191737 A2 | | 8/1986 |
| GB | 2250976 A | | 6/1992 |
| JP | S6323294 U | | 2/1988 |
| JP | H11093265 A | | 4/1999 |
| JP | 2012140205 A | | 7/2012 |
| JP | 2013256327 A | | 12/2013 |
| KR | 19970009675 | * | 3/1997 |
| KR | 20120117413 | * | 10/2012 |
| KR | 101381592 | * | 3/2014 |
| KR | 101393257 | | 5/2014 |
| KR | 20140097083 | * | 8/2014 |
| WO | 2014027086 A1 | | 2/2014 |

OTHER PUBLICATIONS

Chinese Search Report for Application No. CN 201780003261.0 dated Jun. 11, 2019.
Wang et al., "Logistics Facilities and Equipment", Chongqing University Press, Chongqing, China, Nov. 2012, ISBN 978-7-5624-6931-5 (Abstract Translation Only).
Xu et al., "Practical Design Manual of Automated Stereoscopic Warehouse", China Material Press, Beijing, China, Mar. 2009, ISBN 978-7-5047-2938-5 (Abstract Translation Only).
Extended European Search Report including Written Opinion for Application No. EP17736148.2 dated Nov. 28, 2018.
Chinese Search Report for Application No. CN201780003261.0 dated Dec. 3, 2018.

* cited by examiner

CONTAINER

TECHNICAL FIELD

The present invention relates to a container, and more particularly, to a container having an anti-vibration property so that the container does not shake in vibration.

BACKGROUND ART

Cross-Reference to Related Application

The present application is a national phase entry under 35 U.S.C. § 371 of International Application No. PCT/KR2017/000215, filed on Jan. 6, 2017, which claims priority from Korean Patent Application No. 10-2016-0002043, filed on Jan. 7, 2016, all of which are incorporated herein by reference.

Containers refer to box-shaped containers used to economically transport cargos. Such a container may be used to store and transport a variety of cargos such as clothing, electronics, furniture, agricultural products, and the like. Particularly, such a container may be used for loading, storing, and transporting batteries such as secondary batteries.

Particularly, a container capable of storing energy by providing a plurality of batteries therein is called a battery energy storage system (BESS) container.

In such a BESS container, it may be very important to be manufactured so as not to be shaken even when vibration due to the earthquake or the like occurs. If the battery becomes unstable due to the vibration, the battery may be overheated or exploded.

The container according to the related art does not have a structure for preventing the vibration as described above. Particularly, it is more difficult to change a structure to satisfy anti-vibration standards in ISO standard container (ISO 40ftHC etc.).

Also, the BESS container has to have high energy density, many battery racks and equipment are installed in the container, and the container has a large load, and thus, it is difficult to meet the anti-vibration standard.

DISCLOSURE OF THE INVENTION

Technical Problem

Therefore, the present invention had been made to solve the abovementioned problems, and an object of the present invention is to provide a container having an anti-vibration property so that the container does not shake in vibration.

Technical Solution

A container according to the present invention comprises a bottom part, a ceiling part facing the bottom part, a sidewall part connecting the bottom part to the ceiling part, and a rack installed to be fixed in an inner space that is surrounded by the bottom part, the ceiling part, and the sidewall part.

Advantageous Effects

The container according to the present invention may comprise a bottom part, a ceiling part facing the bottom part, a sidewall part connecting the bottom part to the ceiling part, and a rack installed to be fixed in an inner space that is surrounded by the bottom part, the ceiling part, and the sidewall part and thus may have the anti-vibration property without being shaken by the vibration. Particularly, the BESS container having the ISO standard size, which satisfies the anti-vibration standard, may be realized.

MODE FOR CARRYING OUT THE INVENTION

Preferred embodiments of the present invention will be described below in more detail with reference to the accompanying drawings. However, the present invention is not limited to the embodiments below.

Embodiment 1

Figure 1:
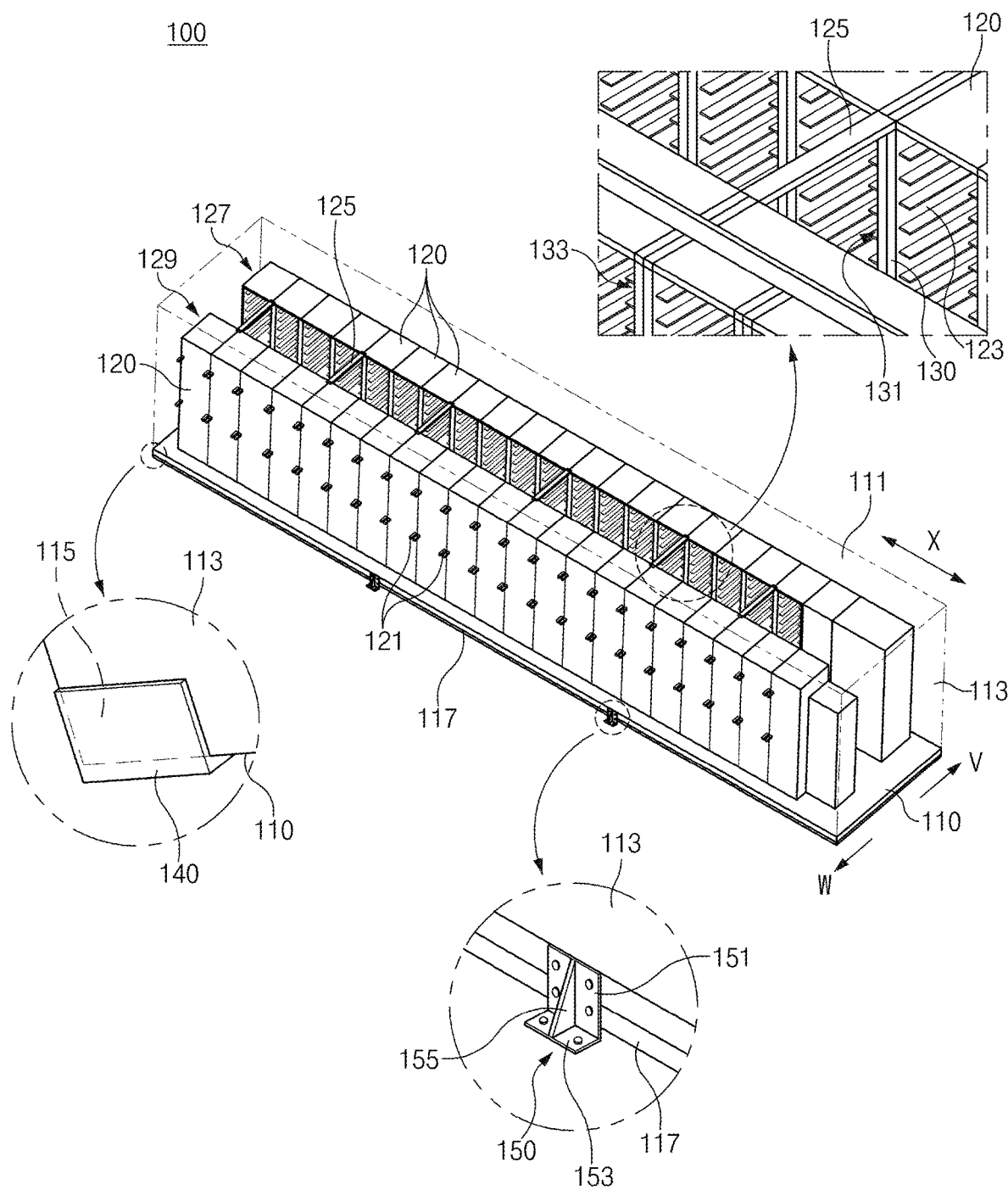
FIG. 1 is a perspective view of a container according to Embodiment 1 of the present invention.
Figure 2:
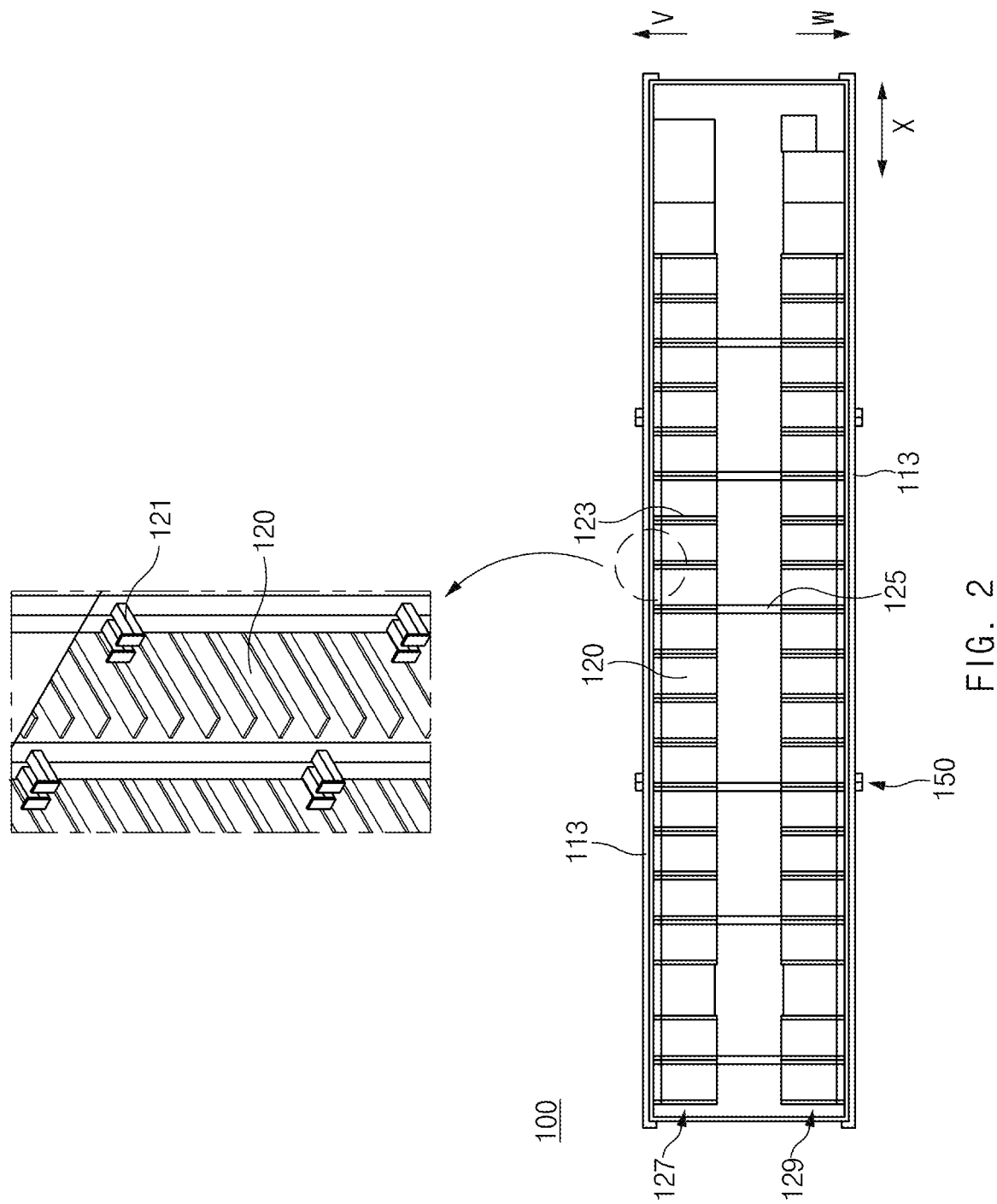
FIG. 2 is a plan view of the container of FIG. 1.
Figure 3:
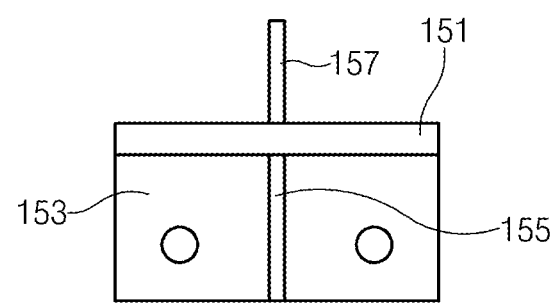
FIG. 3 is a plan view illustrating an anchor unit of the container according to Embodiment 1 of the present invention.
Figure 4:
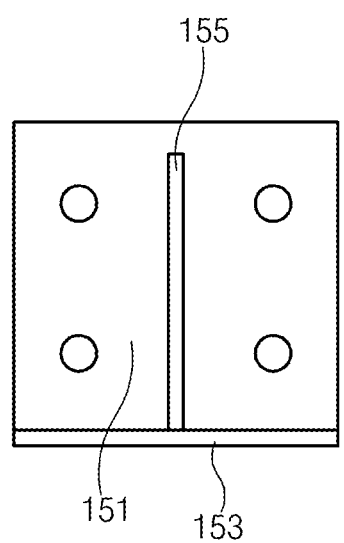
FIG. 4 is a front view illustrating the anchor unit of the container according to Embodiment 1 of the present invention.
Figure 5:
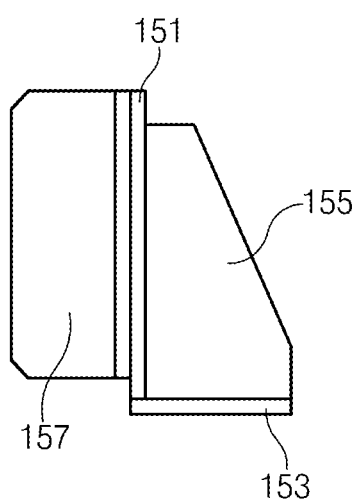
FIG. 5 is a left side view illustrating the anchor unit of the container according to Embodiment 1 of the present invention.

FIG. 1 is a perspective view of a container according to Embodiment 1 of the present invention. FIG. 2 is a plan view of the container of FIG. 1. FIG. 3 is a plan view illustrating an anchor unit of the container according to Embodiment 1 of the present invention. FIG. 4 is a front view illustrating the anchor unit of the container according to Embodiment 1 of the present invention. FIG. 5 is a left side view illustrating the anchor unit of the container according to Embodiment 1 of the present invention.

Hereinafter, a container according to Embodiment 1 of the present invention will be described with reference to FIGS. 1 to 5.

Referring to FIGS. 1 and 2, the container according to Embodiment 1 of the present invention comprises a bottom part 110, a ceiling part 111, a sidewall part 113, and a rack 120.

The rack 120 is configured to load a battery. The rack 120 may comprise a support (not shown) on which the battery is placed. Also, the inside of the rack 120 is divided to be partitioned into predetermined spaces.

The bottom part 110 may have a bottom surface on which the rack 120 is placed. The ceiling part 111 is disposed above the bottom part 110 to face the bottom part 110.

The sidewall part 113 may connect the bottom part 110 to the ceiling part 111. The sidewall part 113 may be configured to support the ceiling part 111 so that the ceiling part 111 is dropped by gravity to the bottom part 110. Also, the sidewall part 113 may be disposed around the rack 120 to surround a side surface of the rack 120.

The rack 120 may be fixed and stalled in an inner space that is surrounded by the bottom part 110, the ceiling part 111, and the sidewall part 113. Thus, the container may be stably fixed without being shaken by external vibration. As a result, the battery stored in the rack 120 within the container may be stably stored and maintained.

The container 100 according to Embodiment 1 of the present invention may have several characteristics in order to prevent shaking and provide an anti-vibration property.

First, the rack 120 may be installed to be fixed to the sidewall part 113. For example, the rack 120 may be fixed to the sidewall part 113 through coupling of a bolt. Alternatively, the rack 120 may be fixed to the sidewall part 113 through a constituent other than the bolt coupling.

Referring to FIG. 2, the rack 120 may comprise a wall protrusion protruding to the sidewall part 113. The wall protrusion 121 may be prevented from being shaken by being supported by the sidewall part 113. The wall protrusion 121 may be supported by the sidewall part 113 in a state in which the wall protrusion 121 is inserted into a groove formed in the sidewall part 113. Particularly, wall protrusions 121 may protrude from upper and central portions of the rack 120 (see FIG. 1). Since the rack 120 is fixed to the sidewall part 113 of the container, the load may be dispersed.

A plurality of racks 120 may be connected in a line to the container 100 according to Embodiment 1 of the present invention. Particularly, the rack 120 may be adjacent in a longitudinal direction X of the container and arranged in a line. Also, the rack 120 may be coupled to the adjacent rack 120 through a bolt. Thus, the rack 120 may be more stably fixed through the bolt coupling.

More particularly, the rack 120 may comprise a side surface part 123 coming into contact with the adjacent rack 120, and the bolt may be coupled to the side surface part 123. M6 bolts may be used to be coupled to four points on the side surface part 123.

The container 100 according to Embodiment 1 of the present invention may comprise a crossbar 125 connecting the rack 120 disposed on one side V of the bottom part 110 to the rack 120 disposed on the other side W of the bottom part 110. The crossbar 125 may restrict relative movement of the rack 120 disposed on the one side V of the bottom part 110 and the rack 120 disposed on the other side W of the bottom part 110.

The rack 120 may comprise a rack post 130 vertically supporting the rack 120. The crossbar 125 may be connected to the rack post 130. Particularly, the crossbar 125 may be connected to the uppermost portion of the rack post 130.

The rack post 130 may have a more expanded shape. This will be described in more detail.

Referring to FIGS. 1 and 2, the container 100 according to Embodiment 1 of the present invention may comprise a first rack line 127 in which the plurality of racks 120 disposed on the one side V of the bottom part 110 are connected to each other in a line, a second rack line 129 in which the plurality of racks disposed on the other side W of the bottom part 110 are connected to each other in a line, and the crossbar 125 connecting the first rack line 127 to the second rack line 129. The crossbar 125 may restrict relative movement of the first rack line 127 and the second rack line 129.

Also, the first rack line 127 may comprise a first rack line post 131 vertically supporting the first rack line 127, and the second rack line 129 may comprise a second rack line post 133 vertically supporting the second rack line 129. The crossbar 125 may be configured to connect the first rack line post 131 to the second rack line post 133 (see FIG. 1).

When compared to one rack 120, if the rack lines fixed to be arranged in a line are connected to each other by the crossbar 125 as described above, the shaking of the rack 120 may be more prevented to realize a more improved anti-vibration property. Particularly, when a rigid member is used as the crossbar 125, a relative position of the rack 120 may be more strongly fixed.

Also, the crossbar 125 may connect the uppermost portion of the first rack line post 131 to the uppermost portion of the second rack line post 133. When the crossbar 125 is disposed at the uppermost portion of the rack line post, the shaking may be more prevented.

The reason for this is as follows. That is, the rack 120 coming into contact with the bottom part 110 or adhering to the bottom part 110 may be more seriously shaken as the rack 120 is away from the bottom part 110. The portion adhering to the bottom part 110 may not be shaken by adhesion force or friction force. On the other hand, the largest movement may occur at the portion that is farthest from the bottom part 110 because the portion has the largest movement radius.

The portion that is farthest from the bottom part 110 may be the uppermost portion of the rack 120, and thus, the largest shaking may occur at the uppermost portion of the rack 120. Thus, when the crossbar 125 is disposed at the uppermost portion of the rack 120 as described above, the shaking of the rack 120 may be maximally prevented.

Furthermore, when the crossbar 125 is disposed at the uppermost portion of the rack line post, a path between the first rack line 127 and the second rack line 129 may be secured, and thus, it may be more advantageous.

Also, referring to FIG. 1, the container 100 according to Embodiment 1 of the present invention may further comprise a reinforcing member 140 disposed on a corner casting part 115 at which two sides of the sidewall part 113, which meet each other at a predetermined angle, and the bottom part 110 meet each other to surround the corner casting part 115. The reinforcing member 140 may absorb or buffer vibration.

Also, at least one or more anchor units 150 may be disposed between the reinforcing member 140 disposed at a corner of one side in the longitudinal direction of the container 100 and the reinforcing member 140 disposed at a corner of the other side.

Referring to FIG. 1, the anchor unit 150 may be configured to support a corner part 117 at which one surface of the sidewall part 113 and the bottom part 110 meet each other. Particularly, the anchor unit 150 will be described with reference to FIGS. 1, 3, 4, and 5.

The anchor unit 150 may comprise a first member 151 facing the first sidewall part 113, a second member 153 extending from a lower end of the first member 151 in a direction parallel to the bottom part 110, a rib member 155 connecting the first member 151 to the second member 153 and supporting the first member 151 and the second member 153, and a protrusion member 157 protruding from the first member 151 to the sidewall part 113 and inserted into the sidewall part 113.

The protrusion member 157 may be inserted into a groove formed in the sidewall part 113. Since the protrusion member 157 is inserted into the groove, the anchor unit 150 may be more firmly coupled to the sidewall part 113. The anchor unit 150 may be disposed between the reinforcing members 140 to more firmly support the container 110. When the anchor unit 150 is provided compared to a case in which the anchor unit 150 is not provided, the load of the container 100 may be effectively dispersed. Particularly, the dispersing effect may be improved when the effect of supporting the container at more points than when only the reinforcing member 140 is provided.

As described above, the container 100 according to Embodiment 1 of the present invention may comprise the characteristic constituent for preventing the container 100 from being shaken and thus have the anti-vibration property that is not shaken by the vibration, and particularly, the BESS container having the ISO standard size may be realized.

Embodiment 2

Figure 6:
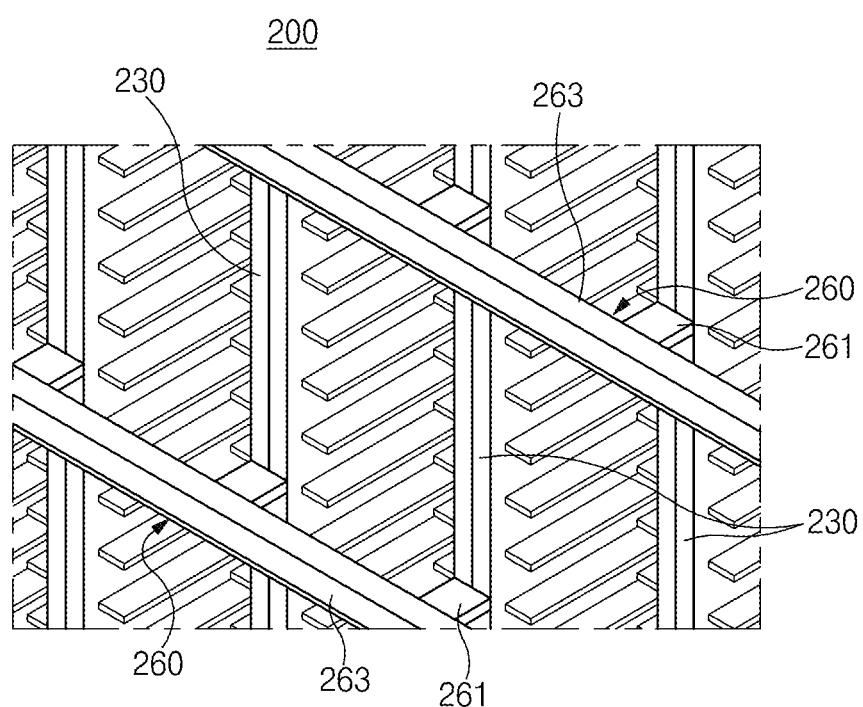
FIG. 6 is a partial perspective view of a container according to Embodiment 2 of the present invention.

FIG. 6 is a partial perspective view of a container according to Embodiment 2 of the present invention.

The container according to Embodiment 2 of the present invention has constituents similar to those of the container according to Embodiment 1 of the present invention. However, the container according to Embodiment 2 is different from that according to Embodiment 1 in that a bracket is further provided.

For reference, the same (equivalent) component as that according to the foregoing embodiment is given by the same (equivalent) reference symbol, and thus, their detailed description will be omitted.

Hereinafter, the container 200 according to Embodiment 2 of the present invention will be described with reference to FIG. 6.

In the container 200 according to Embodiment 2 of the present invention, a plurality of racks may be installed to be connected to each other in a line. Each of the racks may comprise a rack post 230 that vertically supports the rack.

A bracket 260 may be configured to connect and fix the rack posts 230 to each other. For this, the bracket 260 may comprise adhesion parts 261 adhering to the rack post 230 and a long rod part 263 connecting the plurality of adhesion parts 261 to each other. The bracket 260 may be installed at two points of upper and lower portions of the rack post 230.

The container 200 according to Embodiment 2 of the present invention may comprise the bracket 260 to more surely prevent the container 200 from being shaken in a longitudinal direction of the container 200, and thus, more secure the stability of the battery.

While the embodiments of the present invention have been described with reference to the specific embodiments, it will be apparent to those skilled in the art that various changes and modifications may be made without departing from the spirit and scope of the invention as defined in the following claims.

The invention claimed is:

1. A container comprising:
a bottom part;
a ceiling part facing the bottom part;
a sidewall part connecting the bottom part to the ceiling part;
a rack installed to be fixed in an inner space that is surrounded by the bottom part, the ceiling part, and the sidewall part; and
an anchor unit supporting an edge at which one surface of the sidewall part and the bottom part meet each other, wherein the anchor unit comprises:
a first member facing the sidewall part;
a second member extending from a lower end of the first member in a direction parallel to the bottom part;
a rib member connecting the first member to the second member and supporting the first member and the second member; and
a protrusion member protruding from the first member to the sidewall part and inserted into the sidewall part.

2. The container of claim 1, wherein the rack is installed to be fixed to the sidewall part.

3. The container of claim 2, wherein the rack is fixed to the sidewall part by bolt coupling.

4. The container of claim 2, wherein the rack comprises a wall protrusion protruding toward the sidewall part, and the wall protrusion protrudes from an upper portion or a central portion of the rack.

5. The container of claim 1, wherein the rack includes a plurality of racks connected to each other in a line, and adjacent racks of the plurality of racks are coupled to each other by a bolt.

6. The container of claim 5, wherein adjacent racks of the plurality of racks each have a side surface that comes into contact with each other, and
the bolt is coupled to the side surfaces.

7. The container of claim 1,
wherein the rack is a first rack disposed on one side of the bottom part,
wherein the container further comprises a second rack disposed on another side of the bottom part, and a crossbar connecting the first rack to the second rack, and
wherein the crossbar restricts relative movement of the first rack and the second rack.

8. The container of claim 7, wherein each of the first and second racks includes a rack post vertically supporting the respective rack, and
the crossbar is connected to the rack posts.

9. The container of claim 8, wherein the crossbar is connected to an uppermost portion of each of the rack posts.

10. A container comprising:
a bottom part;
a ceiling part facing the bottom part;
a sidewall part connecting the bottom part to the ceiling part; and
a first rack line in which a plurality racks disposed on one side of the bottom part are connected to each other in a line;
a second rack line in which a plurality of racks disposed on another side of the bottom part are connected to each other in a line;
a crossbar connecting the first rack line to the second rack line; and
an anchor unit supporting an edge at which one surface of the sidewall part and the bottom part meet each other, wherein the anchor unit comprises:
a first member facing the sidewall part;
a second member extending from a lower end of the first member in a direction parallel to the bottom part;
a rib member connecting the first member to the second member and supporting the first member and the second member; and
a protrusion member protruding from the first member to the sidewall part and inserted into the sidewall part,
wherein the crossbar restricts relative movement of the first rack line and the second rack line.

11. The container of claim 10, wherein the first rack line includes a first rack line post vertically supporting the first rack line,
the second rack line includes a second rack line post vertically supporting the second rack line, and
the crossbar connects the first rack line post to the second rack line post.

12. The container of claim 11, wherein the crossbar connects an uppermost portion of the first rack line post to an uppermost portion of the second rack line post.

13. The container of claim 1, further comprising a reinforcing member surrounding a corner casting part at which two sides of the sidewall part, which meet each other at a predetermined angle, and the bottom part meet each other.

14. The container of claim 1, wherein the rack includes a plurality of racks connected to each other in a line,
   each of the racks of the plurality of racks includes a rack post vertically supporting the respective rack, and
   the container further comprises a bracket connecting and fixing the rack posts to each other.

15. The container of claim 14, wherein the bracket includes adhesion parts adhering to the respective rack posts and a long rod part connecting the adhesion parts to each other.

16. The container of claim 1, wherein the protrusion member is inserted into a groove formed in the sidewall part.

\* \* \* \* \*